(12) United States Patent
Davis

(10) Patent No.: US 7,143,795 B1
(45) Date of Patent: Dec. 5, 2006

(54) COPING SAW ATTACHMENT FOR SPIRAL CUT-OFF TOOLS

(76) Inventor: Rodney Ray Davis, 2515 Mapleview Ave., Portage, MI (US) 49024

( * ) Notice: Subject to any disclaimer, the term of this patent is extended or adjusted under 35 U.S.C. 154(b) by 284 days.

(21) Appl. No.: 10/770,067

(22) Filed: Feb. 2, 2004

(51) Int. Cl.
*B27C 5/00* (2006.01)

(52) U.S. Cl. .............................. 144/144.52; 144/144.1; 144/144.41; 144/144.51; 409/121; 409/130

(58) Field of Classification Search ................ 144/137, 144/139, 144.41, 144.51, 144.52, 145.1, 144/154, 372, 144.1; 409/107, 109, 110, 409/125, 126, 130, 121; 33/23.01
See application file for complete search history.

(56) References Cited

U.S. PATENT DOCUMENTS

| | | | | |
|---|---|---|---|---|
| 1,285,795 A | * | 11/1918 | Rivard | 409/121 |
| 1,396,993 A | * | 11/1921 | Carter | 266/62 |
| 3,270,619 A | * | 9/1966 | Magor | 409/102 |
| 3,442,309 A | | 5/1969 | Jentsch | |
| 3,450,001 A | * | 6/1969 | Fortune | 409/130 |
| 3,742,816 A | * | 7/1973 | Carnahan | 409/109 |
| 3,841,368 A | * | 10/1974 | Ritter | 144/136.1 |
| 3,841,370 A | | 10/1974 | Schell | |
| 3,860,050 A | * | 1/1975 | Banks | 144/144.51 |
| 4,062,123 A | | 12/1977 | Lundquist | |
| 4,292,870 A | | 10/1981 | Mericle | |
| 4,579,158 A | * | 4/1986 | O'Meara | 144/144.1 |
| 4,768,570 A | * | 9/1988 | Honeyman | 144/145.1 |
| 4,880,042 A | | 11/1989 | Schafferkotter | |
| 4,995,435 A | * | 2/1991 | Godfrey | 144/363 |
| 5,123,463 A | * | 6/1992 | Grisley | 144/83 |
| 5,325,899 A | * | 7/1994 | Kochling | 144/144.1 |
| 5,363,732 A | | 11/1994 | Heasley | |
| 5,458,171 A | * | 10/1995 | Ward | 144/84 |
| 5,667,001 A | | 9/1997 | Sanger et al. | |
| 5,778,951 A | | 7/1998 | Huitsing | |
| 6,095,726 A | | 8/2000 | Scott et al. | |
| 6,374,879 B1 | | 4/2002 | Lukehart | |
| 6,450,220 B1 | | 9/2002 | Domask | |

FOREIGN PATENT DOCUMENTS

| | | |
|---|---|---|
| CA | 2.230.454 | 10/1998 |
| DE | 10009957 | 6/2001 |
| WO | WO 01/68317 | 9/2001 |

* cited by examiner

*Primary Examiner*—Bena Miller
(74) *Attorney, Agent, or Firm*—Michael I. Kroll

(57) ABSTRACT

An apparatus for an attachment for a cut-out tool 16 whereby the cut-out tool is used to cut an identical image of a molding prototype template 22 into a work piece. The attachment is comprised of a base platform 18 having means for mounting the prototype template 22 and means 52 for mounting and securing a work piece thereto. The attachment is further comprised of a movable platform 12 having means for engaging the base platform 18 and capable of linear movement relative to the base platform. Slidably attached at 32, 50 to the movable platform 12 is the saw mounting platform 14 capable of transverse linear movement relative to the movable platform with a handle 24 depending therefrom and a saw attachment means 20, 68 mounted thereon.

9 Claims, 16 Drawing Sheets

COPING SAW ATTACHMENT FOR SPIRAL CUT-OFF TOOLS

BACKGROUND OF THE INVENTION

1. Field of the Invention

The present invention relates generally to saw attachments and, more specifically, to a jig for a cut-out tool whereby said cut-out tool is used to cut an identical image of a molding prototype template. The jig is comprised of a base platform having means for mounting said prototype template and means for mounting and securing a work piece thereto. The jig is further comprised of a movable platform having means for engaging said base platform and capable of linear movement relative to said base platform.

Slidably attached to the movable platform is the saw mounting platform capable of transverse linear movement relative to the movable platform linear movement with a handle depending therefrom and a saw housing mounted thereon.

Pairs of releasably mountable front and back bushings provides means for mounting and retaining various sized cut-out tools within said saw housing having an aperture forming a throughbore for the cut-out tool blade.

Extending from the underside of the saw mounting platform is a handle member with stanchion-like elements passing through platform apertures serving as handles for control of the cutting function.

The handle member also serves as the base support member for the guide pin fastened at each distal end to the saw mounting platform and handle platform, which in operation resides below the planar surface formed by the top surface of the base platform having the prototype molding template mounted thereon providing means for the guide pin to be supported at both distal ends while tracing the prototype template.

Further structural support for the handle member is incorporated by having an "L" shaped wall extending from the handle platform into a dimensionally equivalent cavity formed on the underside of the saw platform.

It should be noted that providing mounting and retaining means for the handle member and saw housing, other than permanent connection to the saw housing platform, would provide a knock down tool substantially comprised of flat pieces that may include the opposing saw housing side walls having hinge-like connection with the back wall whereby the saw housing would also lie flat during storage.

As previously stated, the base, movable and saw platforms slidably engage each other. This sliding engagement provided by the present invention, in the preferred embodiment occurs in one of two ways. Either a pair of tracks and channels are integrally formed between the base and movable platforms and another pair formed between the movable and saw mounting platforms at the time of fabrication, such as injection molding or slidably engaging tracks having roller or ball bearings located therebetween are positioned and fastened to their respective platform whereby said movable platform is imbued with linear movement relative to the base platform and said saw platform is capable of transverse linear platform movement relative to the movable platform.

2. Description of the Prior Art

There are other saw attachments designed for saw guidance. Typical of these is U.S. Pat. No. 3,442,309 issued to Jentsch on May 6, 1969.

Another patent was issued to Schell on Oct. 15, 1974 as U.S. Pat. No. 3,841,370. Yet another U.S. Pat. No. 4,062,123 was issued to Lundquist on Dec. 13, 1977 and still yet another was issued on Oct. 6, 1981 to Mericle as U.S. Pat. No. 4,292,870.

Another patent was issued to Schafferkotter on Nov. 14, 1989 as U.S. Pat. No. 4,880,042. Yet another U.S. Pat. No. 5,363,732 was issued to Heasley on Nov. 15, 1994. Another was issued to Sanget, et al. on Sep. 16, 1997 as U.S. Pat. No. 5,667,001 and still yet another was issued on Jul. 14, 1998 to Huitsing as U.S. Pat. No. 5,778,951.

Another patent was issued to Scott, et al. on Aug. 1, 2000 as U.S. Pat. No. 6,095,726. Yet another U.S. Pat. No. 6,374,879 was issued to Lukehart on Apr. 23, 2002. Still yet another was issued to Domask on Sep. 17, 2002 as U.S. Pat. No. 6,450,220.

Another patent was issued to Huitsing on Oct. 21, 1998 as Canadian Patent No. 2,230,454. and still yet another was issued on Sep. 6, 2001 to Arlart as German Patent No. DE 100 09 957.

U.S. Pat. No. 3,4420,309

Inventor: Thomas F. Jentsch

Issued: May 6, 1969

A combination of a template and work support with a portable router and means for supporting and guiding the same comprising:

(1) a table-like base having a pair of upstanding parallel spaced rails providing a channel adapted to receive and support material to be worked upon, (2) means for securing material to be worked upon in said channel; and (3) a carriage for supporting such portable router upon the rails of said channel with the cutting bit of such router extending into the latter for cutting engagement with the material supported in said channel comprising:

(a) a frame including a pair of roller bars mounted upon said rails for guided movement longitudinally of said channel, (b) a pair of roller tracks secured to said roller bars in spaced parallel relation transversely of said channel, and (c) a router supporting platform mounted on said roller tracks for movement transversely of said channel as said frame is moved longitudinally thereof facilitating dual directional movement of the cutting bit of said router relative to the material supported in said channel.

U.S. Pat. No. 3,841,370

Inventor: Friedrich Peter Schell

Issued: Oct. 15, 1974

An improved feeding and shaping assembly comprises an upper platform on a reciprocally driven support carriage with means providing pivotal and pendular or eccentric displacement of the upper platform relative to the support carriage, means for driving the support carriage, means for providing controlled linear guidance of the reciprocally driven support carriage and adjustable biasing means for urging the upper platform laterally with respect to the support carriage. In a preferred embodiment the pivotal displacement is provided by a plurality of pivot arms one end of each arm being attached to the upper platform and the opposite end to the support carriage.

U.S. Pat. No. 4,062,123

Inventor: Ray Arnold Lundquist

Issued: Dec. 13, 1977

An adjustable routing template intended for use with a routing tool, such as a powered router having a router bit and a guide or reference spindle or bushing, in a manner allowing a craftsman to rout a variety of ornamental designs consisting of grooves and recesses on work pieces such as custom cabinets, doors and the like, the template consisting of a set of bar members or leg members which are identical to each other except some may be longer than others, with the bar members being slidingly interconnected by a plurality of identically configured adjustable connecting links and selectable wedge shaped angle block members to define an open frame type configuration having a flat continuous co-planar bottom surface to lie parallel to and flatly on a work piece to be routed in a manner to provide rigid guide edges in adjustable spaced relationship to the work piece for guiding the routing tool there over. The number of interconnected bar members may be selectably increased to provide for the routing of a variety of ornamental designs on the work piece.

U.S. Pat. No. 4,292,870

Inventor: John E. Mericle

Issued: Oct. 6, 1981

Multi-parallel channels of a guide plate support inset slidable tracks. A wood working tool is dependingly mounted to the tracks for translation past a work piece temporarily fixedly secured to the guide plate and works the work piece along a true line dictated by the sliding fit and translation of the tracks within the channels. In a variant, the wood working tool is positionally fixed to the guide plate and the work piece, secured to tracks within the channels, is translated past the wood working tool to work a true line.

U.S. Pat. No. 4,880,042

Inventor: Harvey W. Schafferkotter

Issued: Nov. 14, 1989

A device for cutting a segment of molding for angular mating with a second segment of molding. The device comprises a table portion for holding a segment of molding, and a cutter guide portion for guiding a cutting mechanism. The cutter guide portion is mounted on the table portion and comprises a template oriented angularly with respect to the table portion. The template can receive a cutting mechanism extending through an opening in the template such that the cutting mechanism extends angularly with respect to a segment of molding held on the table portion. The opening is shaped such that a segment of molding held on the table portion may be cut by tracing the opening with the cutting mechanism, thereby providing the segment of molding with a recessed angle at one end and an edge at that end corresponding to the contour of a second segment of molding to which said first segment is to be mated. Related methods are also disclosed.

U.S. Pat. No. 5,363,732

Inventor: Raymond E. Heasley

Issued: Nov. 15, 1994

A coping apparatus is provided to impart to the end portion of a molding. A contoured surface corresponding to the profile of the face surface of the molding. The coping apparatus includes a circular saw that is mounted on two sliding bases for freedom of movement in "X" "Y" directions. Beside the circular saw there is a support for a stylus used to control the positioning of the saw blade by traversing movement along the profile of a template. The template is supported on a stationary base underlying a table of which the end portion of the molding to be coped is supported.

U.S. Pat. No. 5,667,001

Inventor: Wallace D. Sanger, et al.

Issued: Sep. 16, 1997

An apparatus for cutting an end of a work piece having a work piece curved face along a curve which is substantially the mirror image of the cross-sectional curvature of the work piece curved face includes a work piece support structure; a work piece anchoring and positioning structure for securing the work piece onto the support structure in a position to be cut; a cutting assembly carriage structure mounted to move toward and away from the end of the work piece; a work piece cutting assembly slidably mounted on the cutting assembly guide structure and including a work piece cutting member; a cutting member guide structure including a guide template having a template guide surface with a guide surface contour; and a guide surface following structure connected to the work piece cutting assembly for guiding the cutting member along a path substantially duplicating the guide surface contour. The work piece support structure preferably includes a platform member resting on several platform member legs. The work piece cutting assembly guide structure preferably includes a rail arm including an elongate member pivotally connected to the apparatus to pivot toward and away from the work piece; where the cutting assembly carriage is slidably mounted on the rail arm. The work piece cutting assembly preferably includes a router motor tool having a router bit secured into a router chuck which is mounted on a drive shaft of a router motor, where the router motor tool is mounted on the carriage.

U.S. Pat. No. 5,778,951

Inventor: John A. Huitsing

Issued: Jul. 14, 1998

A device for cutting trim moldings according to their displayed surface designs including a base for securely holding various molding widths, a profile gauge and a clamp for locking the profile gauge in an adjusted position on the base for a selected molding. The edge of the profile gauge functions to guide a cutting device such as a router. In a preferred embodiment, the clamp includes a router plate which is mounted at a predetermined angle relative to the base so the object molding is cut at such angle.

U.S. Pat. No. 6,095,726

Inventor: Martin Scott et al.

Issued: Aug. 1, 2000

A coping device includes a circular blade, a template having an end provided with a coped profile, a stylus which traces the coped profile of the template and which preferably has substantially the same width and radius of curvature as the blade, clamps for respectively securing the molding and the template in a fixed position, and a base having a stationary portion and a movable portion movable in X and Y directions relative to the stationary portion. The clamps are coupled to the stationary portion, and the blade and the stylus are both coupled to the movable portion. The blade and the stylus are substantially simultaneously movable relative to the clamps so that the molding can be coped with the blade as the stylus traverses the coped profile of the template. The blade and the stylus have the same width, and the stylus is provided with a leading edge having a radii used contour matching the blade. In addition, when coping a crown molding, the blade and the stylus are tiltable to the same angle.

U.S. Pat. No. 6,374,879

Inventor: Brett Lukehart

Issued: Apr. 23, 2002

A coping machine for making miter cuts on baseboard or crown molding stock includes a work platform supported on vertically movable spring assemblies. Stock to be cut is positioned on the work platform. A rotating cutting knife is disposed adjacent a rear edge of the work platform. Operation of a single lever mechanism functions to move the platform in a downward vertical direction so that the stock may be cut by the rotating cutting knife. The spring assemblies automatically return the platform to its original position when the single lever is released.

U.S. Pat. No. 6,450,220

Inventor: Dennis P. Domask

Issued: Sep. 17, 2002

A coping jig for guiding a router in cutting the end of a section of decorative trim, preferably for creating an inside corner. The coping jig includes a stationary molding stage that receives a section of molding to be cut. A template platform is mounted above the molding stage by a plurality of resilient mounting members. The resilient mounting members allow the angle of the template platform to change relative to the molding stage. The template platform includes at least one template having a trim pattern formed on an edge surface of the template. The trim pattern is used to guide the router in cutting the molding positioned between the template and the molding stage.

Canadian Patent Number 2,230,454

Inventor: John A. Huitsing

Issued: Oct. 21, 1998

A device for cutting trim moldings according to their displayed surface designs including a base for securely holding various molding widths, a profile gauge and a clamp for locking the profile gauge in an adjusted position on the base for a selected molding. The edge of the profile gauge functions to guide a cutting device such as a router. In a preferred embodiment, the clamp includes a router plate which is mounted at a predetermined angle relative to the base so the object molding is cut at such angle.

German Patent Number DE 100 09 957

Inventor: Gerhard Arlart

Issued: Sep. 6, 2001

The setdown slide consists of a thin main body to bear on and so bridge the two parallel template guide bars and is recessed for the copying sleeve of the upper milling tool lying on the body along with the table). The sleeve engaging the recess can in this way be guided simultaneously along the inner edge of the template and the inside rim of the recess. Reinforcement along one edge parallel to the recess counteracts any body flexure under tool weight. The slide can be fixed in area to allow milling templates to be fixed on template. An insert running in a keyway in the recess ensures template adjustment as required with the aid of a key block on the body underside to run in the template groove way. The block is fixed via screw hole on the continuation of the recess center axis and a second semicircular recess takes a graduated scale WIPO Publication Number WO 01/68317

Inventor: Dennis P. Domask

Issued: Sep. 20, 2001

A coping saw jig for guiding a router in cutting the end of a section of decorative trim, preferably for creating an inside corner. The coping jig includes a stationary molding stage that receives a section of molding to be cut. A template platform is mounted above the molding stage by a plurality of resilient mounting members. The resilient mounting members allow the angle of the template platform to change relative to the molding stage. The template platform includes at least one template having a trim pattern formed on an edge surface of the template. The trim pattern is used to guide the router in cutting the molding positioned between the template and the molding stage.

While these saw attachments may be suitable for the purposes for which they were designed, they would not be as suitable for the purposes of the present invention, as hereinafter described.

SUMMARY OF THE PRESENT INVENTION

The present invention discloses an attachment for a cut-out tool whereby the cut-out tool is used to cut an identical image of a molding prototype template into a work piece. The attachment is comprised of a base platform having means for mounting the prototype template and means for mounting and securing a work piece thereto. The attachment is further comprised of a movable platform having means for engaging the base platform and capable of linear movement relative to the base platform. Slidably attached to the movable platform is the saw mounting platform capable of transverse linear movement relative to the movable platform with a handle depending therefrom and a saw attachment means mounted thereon. Pairs of releasably mountable front and back bushings provide means for mounting and retaining various sized cut-out tools within the saw housing having an aperture forming a throughbore for the cut-out tool bit. Extending from the underside of the saw mounting platform is a handle member with stanchion-like elements passing through platform apertures serving as handles for control of the cutting function. The handle member also serves as the base support member for the guide pin fastened at each distal end to the saw mounting platform and handle platform, which in operation resides below the planar surface formed by the top surface of the base platform having the prototype molding template mounted thereon providing means for the guide pin to be supported at both distal ends while tracing the prototype template. Further structural support for the handle members is incorporated by having an "L"-shaped wall extending from the handle platform into a dimensionally equivalent cavity formed on the underside of the saw platform.

A primary object of the present invention is to provide a coping saw jig that is inexpensive to manufacture.

Another object of the present invention is to provide a coping saw jig having three platforms slidably attached to each other.

Yet another object of the present invention is to provide a coping saw jig with a base with a moveable platform slidably attached thereto having linear movement relative to the base platform.

Still yet another object of the present invention is to provide a coping saw jig with a saw housing platform slidably engaging said moveable platform having transverse linear movement relative to the base platform movement.

Another object of the present invention is to provide a coping saw jig with a saw housing mounted to the saw housing platform having bushings for mounting a variety of rotary cut-off tools types within said housing.

Yet another object of the present invention is to provide a coping saw jig with a handle member depending from the saw housing platform underside.

Still yet another object of the present invention is to provide a coping saw jig wherein said handle member has stanchion depending from the saw platform topside forming handles.

Another object of the present invention is to provide a coping saw jig wherein said handle member platform has a structural member extending therefrom seating into a dimensionally similar cavity positioned on the underside of the saw platform.

Yet another object of the present invention is to provide a coping saw jig having a guide pin extending between the saw platform and the handle platform with each distal end fastened thereto.

Still yet another object of the present invention is to provide a coping jig having means positioned between each engaging platform whereby one platform is movable relative to the other.

Another object of the present invention is to provide a coping saw jig wherein said movement is provided by integral platform tracks and channels or slidably engaging tracks having roller or ball bearings positioned therebetween and fastened between the platforms whereby the platforms have linear movement relative to and perpendicular with each other.

Yet another object of the present invention is to incorporate the use of popular new spiral rotary cut-off tools as made and sold.

Additional objects of the present invention will appear as the description proceeds.

The present invention overcomes the shortcomings of the prior art by providing a jig for a coping saw whereby said coping saw is used to cut an identical image of a molding prototype template. The jig is comprised of a base platform having means for mounting said prototype template and means for mounting and securing a work piece thereto. The jig is further comprised of a movable platform having means for engaging said base platform and capable of linear movement relative to said base platform.

Slidably attached to the movable platform is the saw mounting platform capable of transverse linear movement relative to the movable platform linear movement with a handle depending therefrom and a saw housing mounted thereon.

Pairs of releasably mountable front and back bushings provides means for mounting and retaining various sided coping saws within said saw housing having an aperture forming a throughbore for the coping saw blade.

Extending from the underside of the saw mounting platform is a handle member with stanchion-like elements passing through platform apertures serving as handles for control of the cutting function.

The handle member also serves as the base support member for the guide pin fastened at each distal end to the saw mounting platform and handle platform, which in operation resides below the planar surface formed by the top surface of the base platform having the prototype molding template mounted thereon providing means for the guide pin to be supported at both distal ends while tracing the prototype template.

Further structural support for the handle member is incorporated by having an L-shaped-like member extending from the handle platform into a dimensionally equivalent cavity formed on the underside of the saw platform.

It should be noted that providing mounting and retaining means for the handle member and saw housing, other than permanent connection to the saw housing platform, would provide a knock down tool substantially comprised of flat pieces that may include the opposing saw housing side walls having hinge-like connection with the back wall whereby the saw housing would also lie flat during storage.

As previously stated, the base, movable and saw platforms slidably engage each other. This sliding engagement provided by the present invention, in the preferred embodiment occurs in one of two ways. Either a pair of tracks and channels are integrally formed between the base and movable platforms and another pair formed between the movable and saw mounting platforms at the time of fabrication, such as injection molding or slidably engaging tracks having roller or ball bearings located therebetween are positioned and fastened to their respective platform whereby said movable platform is imbued with linear movement relative to the base platform and said saw platform is capable of transverse linear platform movement relative to the movable platform.

The foregoing and other objects and advantages will appear from the description to follow. In the description reference is made to the accompanying drawings which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
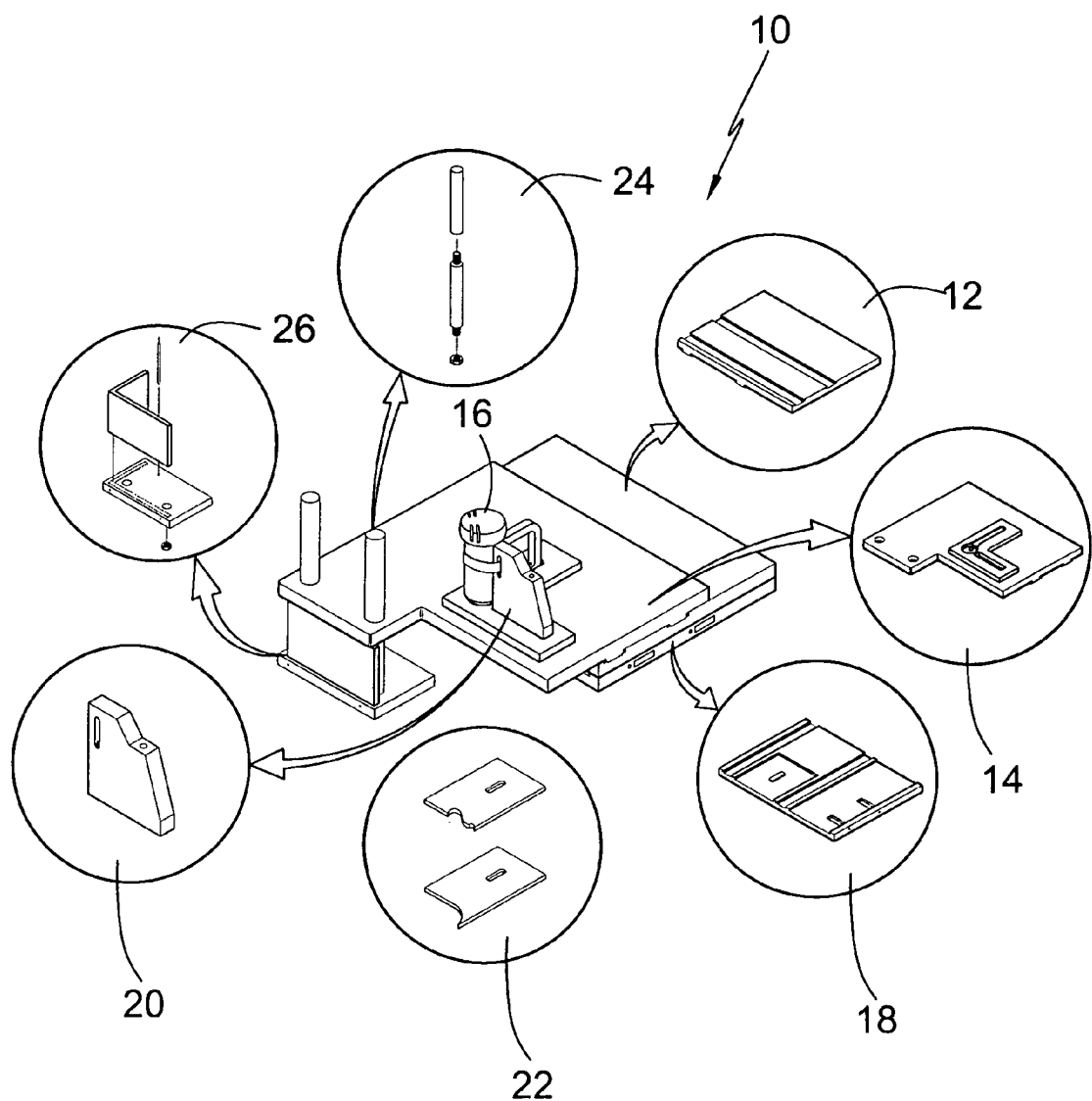
FIG. 1 is an illustrative view of the present invention.

With regard to reference numerals used, the following numbering is used throughout the drawings.

10 present invention
12 middle plate
14 top plate
16 cut-out tool
18 base plate
20 means for attaching
22 template
24 handle
26 "L" support
30 strap
32 sliding means
34 handle threaded piece
36 guide pin
38 retaining bolt
40 pivotal locking elements
42 tool bit aperture
44 handle apertures
46 guide pin
48 support aperture
50 channel
52 base portion -continued 54 template position
56 template stop
58 spring
60 handle nut
62 pin
64 front bushing
66 back bushing
68 attaching means
70 arrow
72 clamp
74 inner member
76 outer member

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10. The present invention 10 comprises an attachment for spiral cut-out tools 16 transforming them into precise coping machines for coping corners on baseboard and chair rail moldings. The attachment has a first middle 12 and second, top plate or platform 14 moving perpendicular to each other with the top platform 14 having means for attaching 20 a cut-out tool 16 and having a cutting bit aperture passing therethrough, the attachment having a base plate 18 to be clamped to a bench, the base to hold a work piece and a template or pattern piece 22, and also providing slidable means for attaching the first and second platforms. Also shown are handles 24 and support 26.

Figure 2:
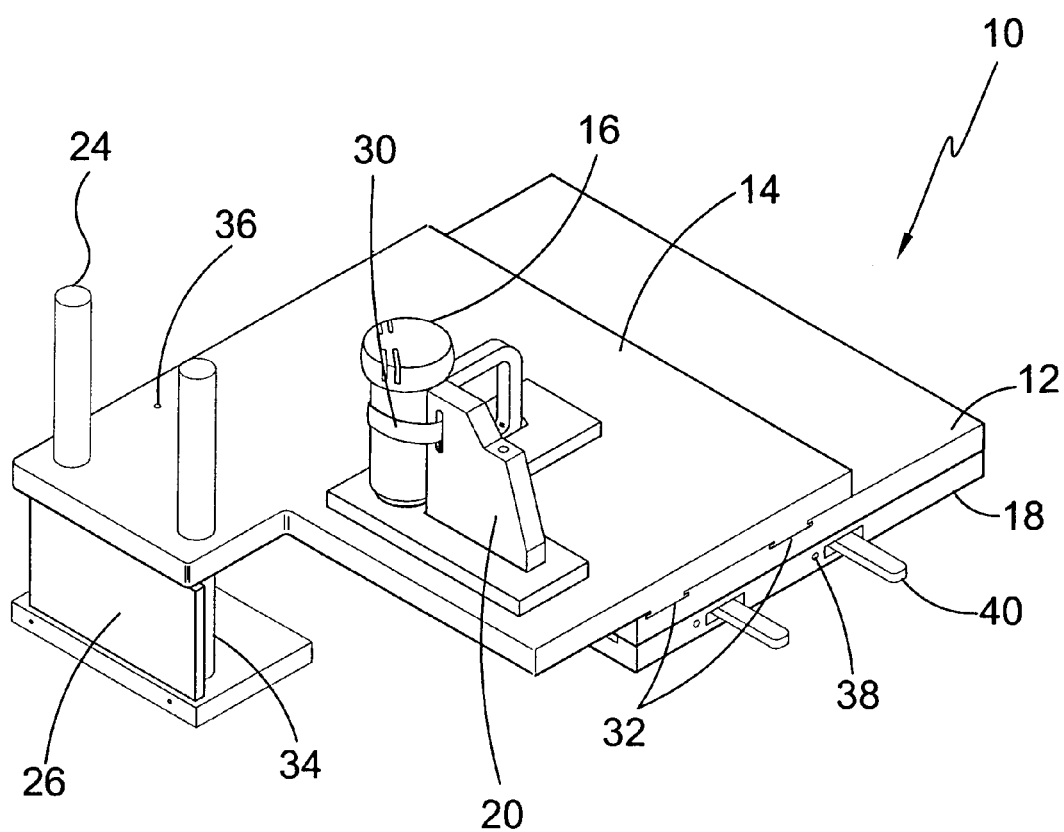
FIG. 2 is a perspective view of the present invention assembled.

Turning to FIG. 2, shown therein is a perspective view of the present invention 10 assembled. Shown is the present invention 10 having an attachment means 20 for spiral cut-out tools 16 with strap 30 transforming them into precise coping machines for coping corners on baseboard, and chair rail moldings. The attachment 10 has a first middle piece 12 and second top piece or platform 14 movable on each other using sliders 32 with the second platform 14 having means 20 for attaching a cut-out tool 16 and having a tool cutting bit aperture passing therethrough, the attachment having a base piece 18 to be clamped to a bench, the base 18 to hold a work piece and a pattern piece, and also providing slidable means 32 for attaching the first and second platforms. Also shown are handles 24, "L" support 26, handle threaded piece 34, guide pin 36, retaining bolt 38 and pivotal locking element 40.

Figure 3:
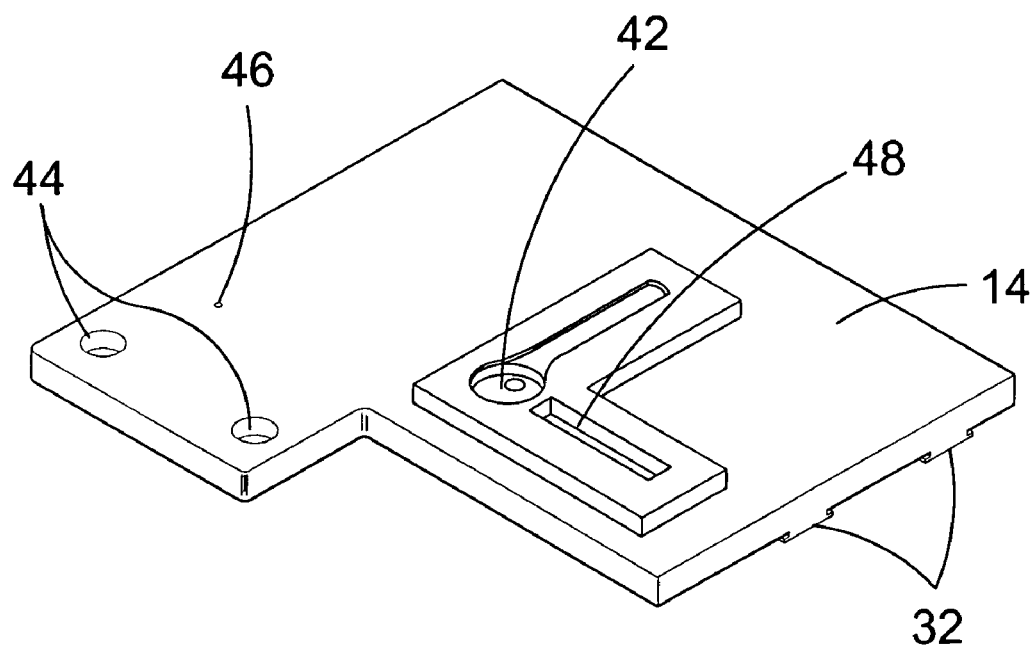
FIG. 3 is a perspective view of the top piece of the present invention.

Turning to FIG. 3, shown therein is a perspective view of the top piece 14 of the present invention. Shown is the top piece 14 of the present invention comprising a spiral cut-out tool attachment having a first and second platform 14 movable on each other, the second platform 14 having means for attaching a tool and a rotatable tool bit aperture 42 passing therethrough, the attachment having a base for holding a work piece and slidable means 32 for attaching the first and second platforms. Also shown are handle apertures 44, guide pin apertures 46 and support aperture 48.

Figure 4:
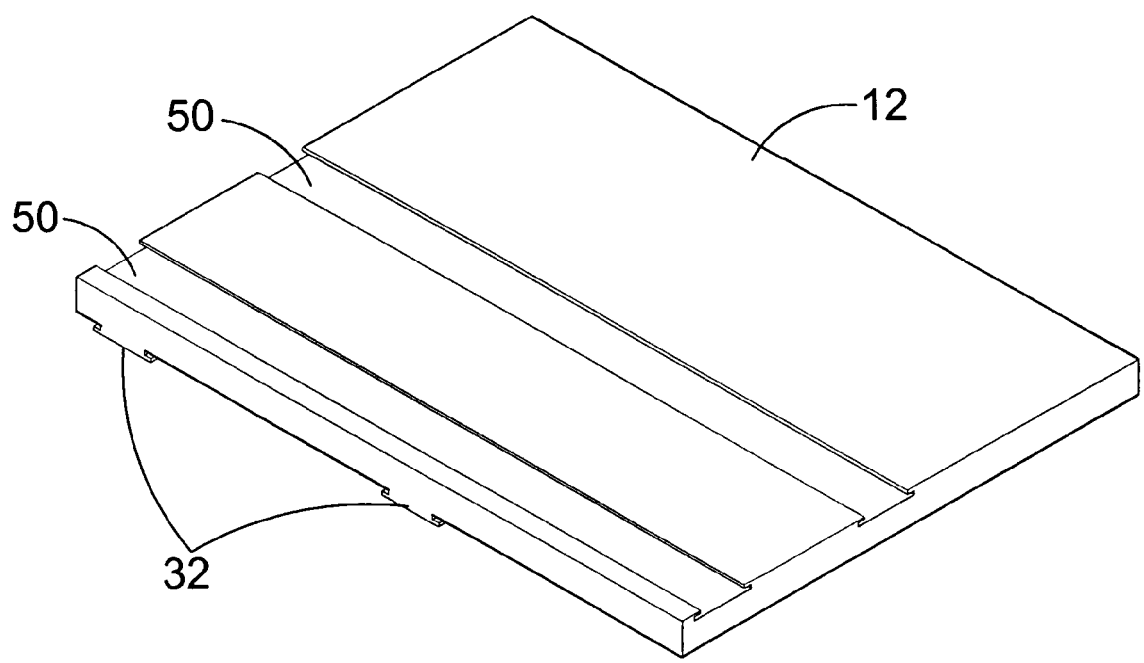
FIG. 4 is a perspective view of the middle plate of the present invention.

Turning to FIG. 4, shown therein is a perspective view of the middle plate 12 of the present invention. Shown is the middle plate 12 of the present invention for a spiral cut-out tool attachment having a first 12 and second platform moving perpendicular to each other, the second platform having means for attaching a tool and a tool bit aperture 42 passing therethrough, the attachment having a base for holding a work piece and slidable means 32 for attaching the first and second platforms. Channels or tracks 50 are also shown.

Figure 5:
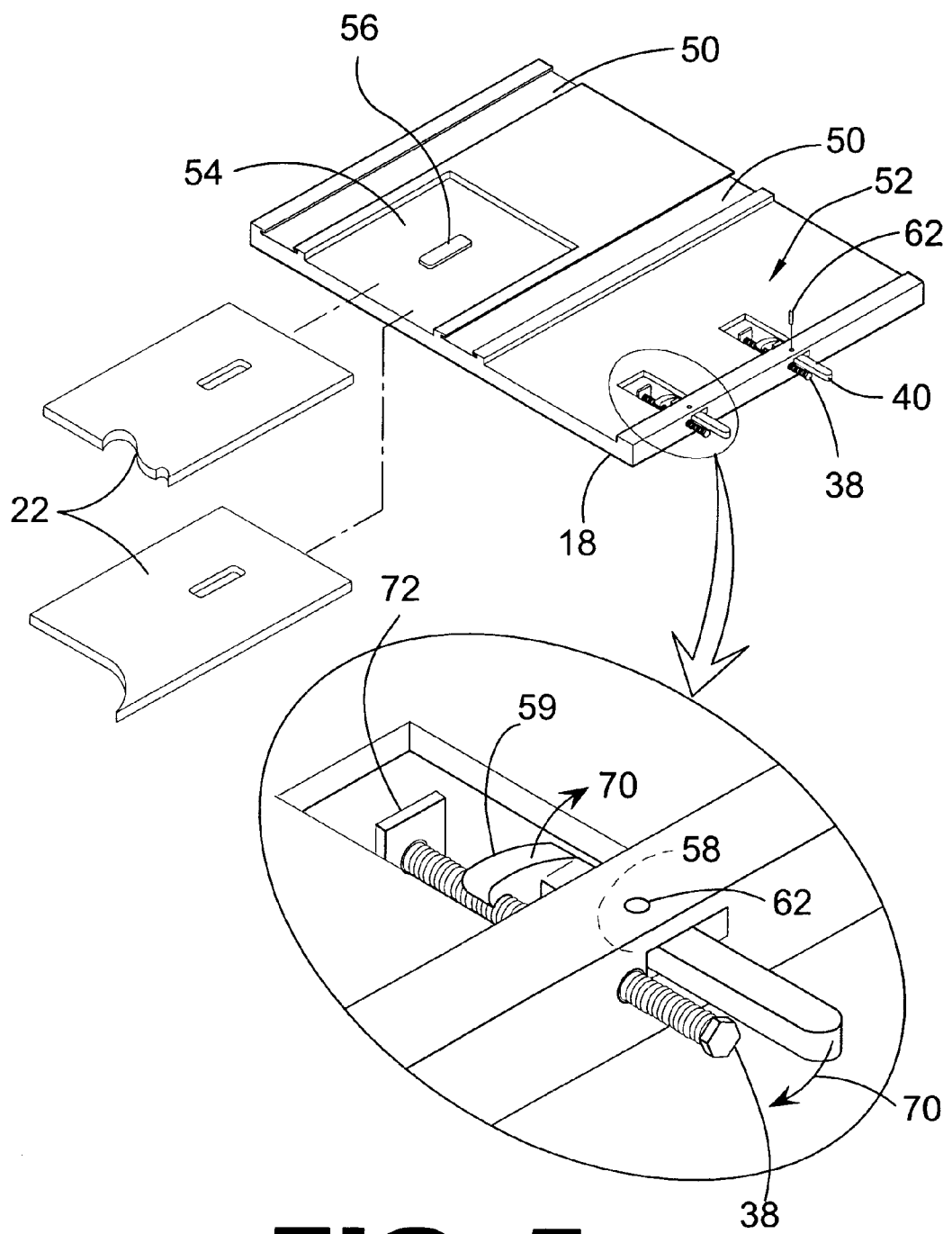
FIG. 5 is a perspective view of the base plate of the present invention.

Turning to FIG. 5, shown therein is a perspective view of the base plate 18 of the present invention. Shown is the base plate 18 and work piece templates 22 having a shaped edge thereon, the base having a designated base portion 52 for holding a work piece and slidable channel means 50 for attaching the first and second platforms. Also shown are designated template position 54, template stop 56, retaining bolt 38, pivotal locking element 40 being pivoted about pin 62 and spring 58. The pivotal locking element 40 when disengaged at its head 59 as shown by arrow 70 allows the bolt 38 to freely move inwardly or forward and outwardly or backward. Once the locking member 40 is released, an internal spring 58 causes the threaded head 59 of locking element to engage the threaded bolt 38 allowing torque to be applied to bolt 38, therein clamping a work piece in space 52 to base plate 18 by having clamp member 72 of bolt 38 engage the work piece. Spring 58 inwardly biases pivotal member 40.

Figure 6:
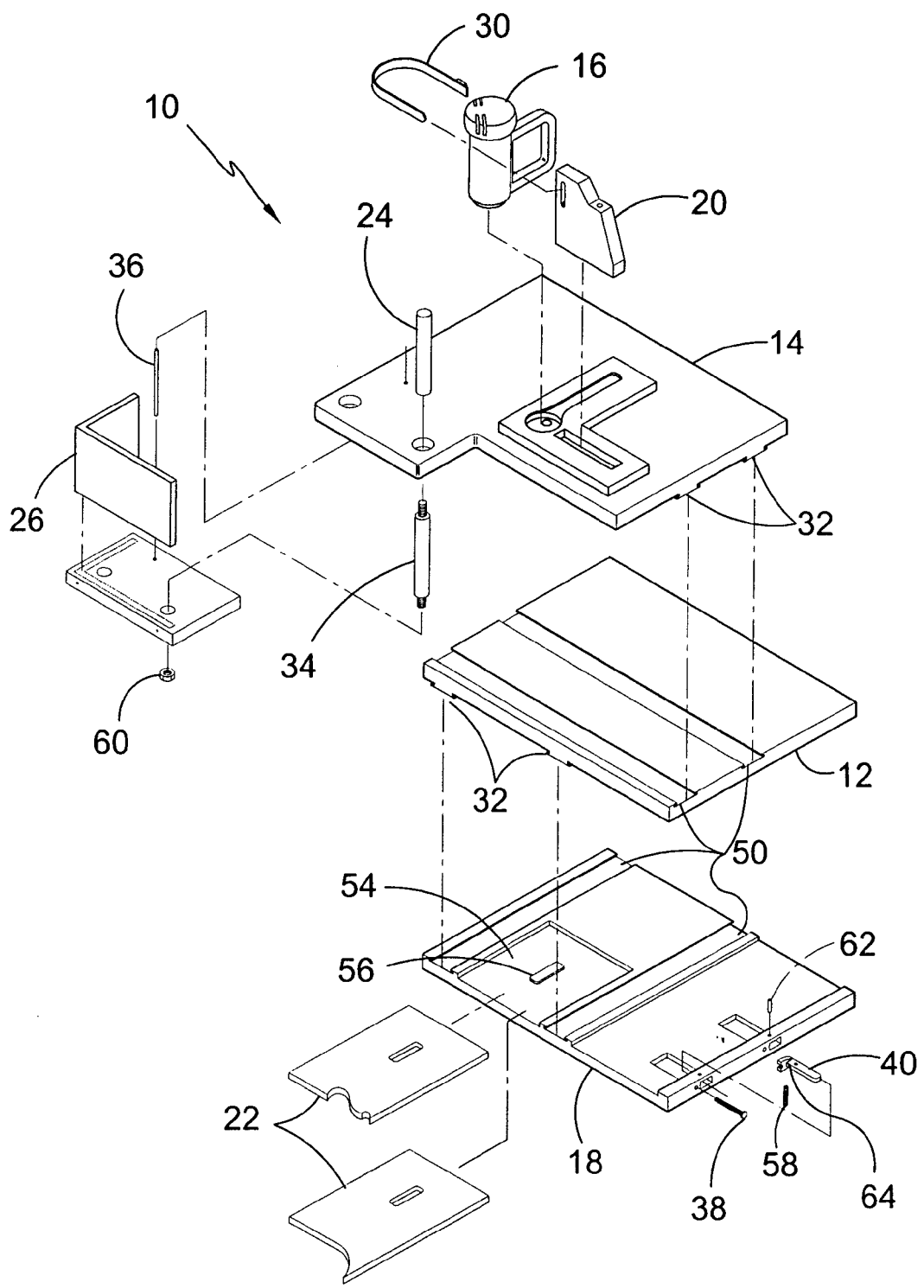
FIG. 6 is an exploded view of the present invention.

Turning to FIG. 6, shown therein is an exploded view of the present invention 10. Shown is an exploded view of the present invention 10 comprising a spiral cut-out tool attachment 20 having a first 12 and second 14 platform moving perpendicular to each other, the second platform 14 having means for attaching a cut-out tool 16 with strap 30 and a tool bit aperture passing therethrough, the attachment having a base 18 for holding a work piece and slidable means 32 in channels 50 for attaching the first and second platforms. Also shown are handle 24, support 26, handle threaded piece 34, guide pin 36, retaining bolt 38 and pivotal locking element 40. Also shown are handle nut 60, template 22, template stop 56, template position 54, spring 58, pin 62 and spring cavity 64.

Figure 7:
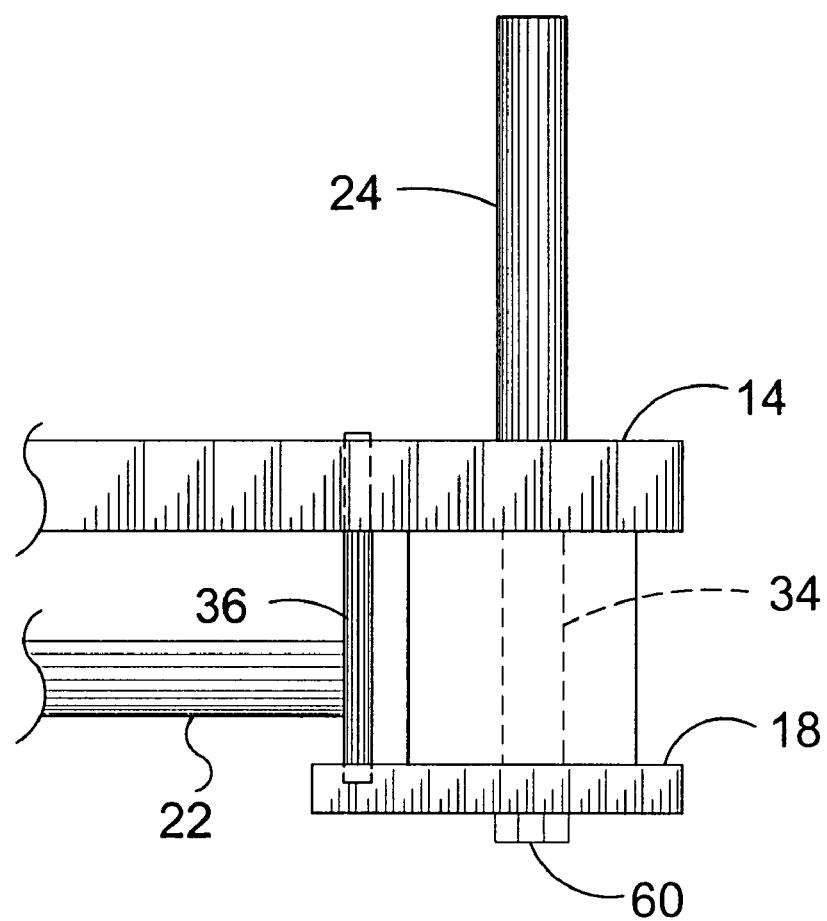
FIG. 7 is a partial side view of the present invention.

Turning to FIG. 7, shown therein is a partial side view of the present invention. Shown is a partial side view of the present invention showing the template or stencil 22 engaging the guide pin 36. Also shown are top piece 14, base 18, handle 24, handle threaded piece 34 and handle nut 60.

Figure 8:
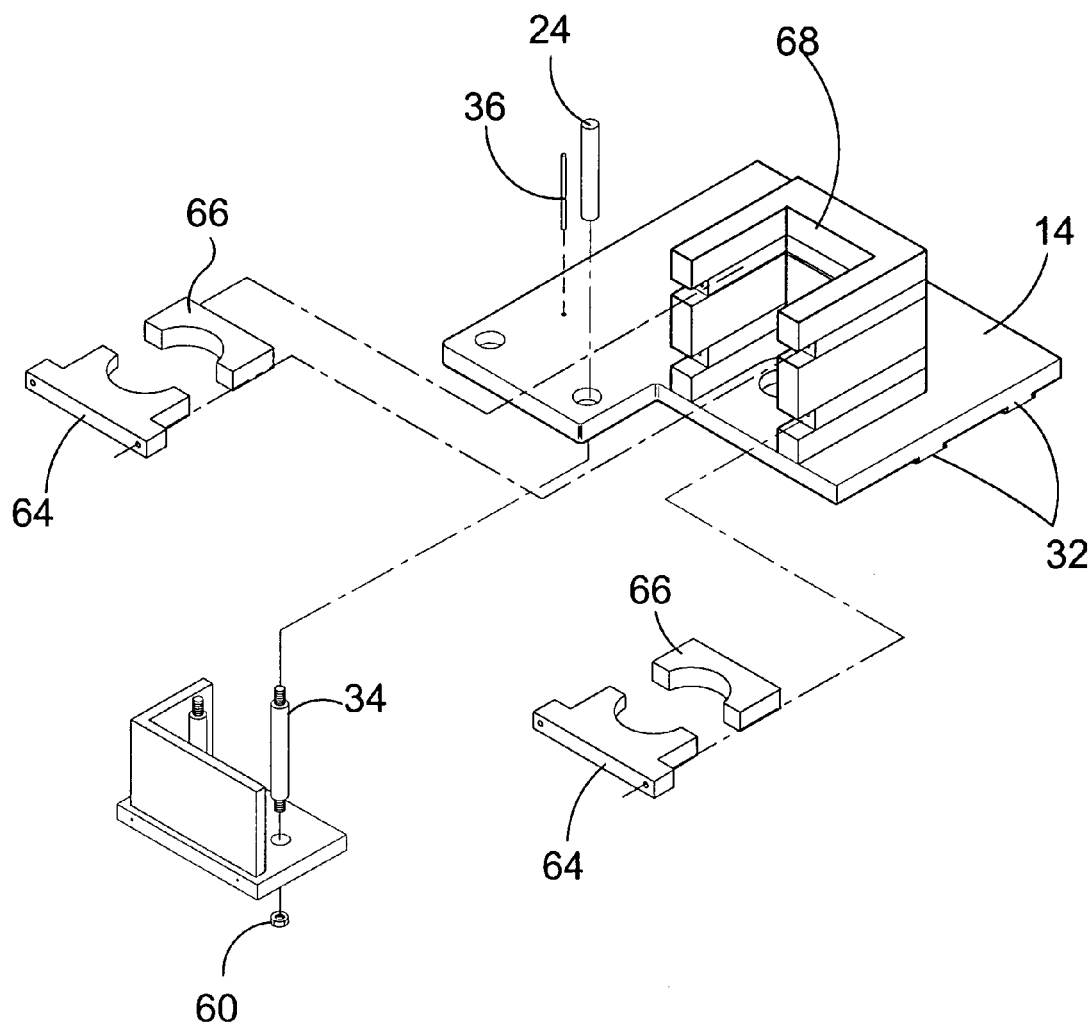
FIG. 8 is a perspective view of an alternate top plate of the present invention.

Turning to FIG. 8, shown therein is a perspective view of an alternate top plate 14 with coping saw attachment means 68 of the present invention. Shown is an alternate top plate 14 of the present invention having attachable handles 24 and guide pin 36 with upper and lower front 64 and back bushings 66 for securing a spiral cut-out tool thereinbetween. Also shown are sliders 32, handle threaded piece 34 and handle nut 60.

Figure 9:
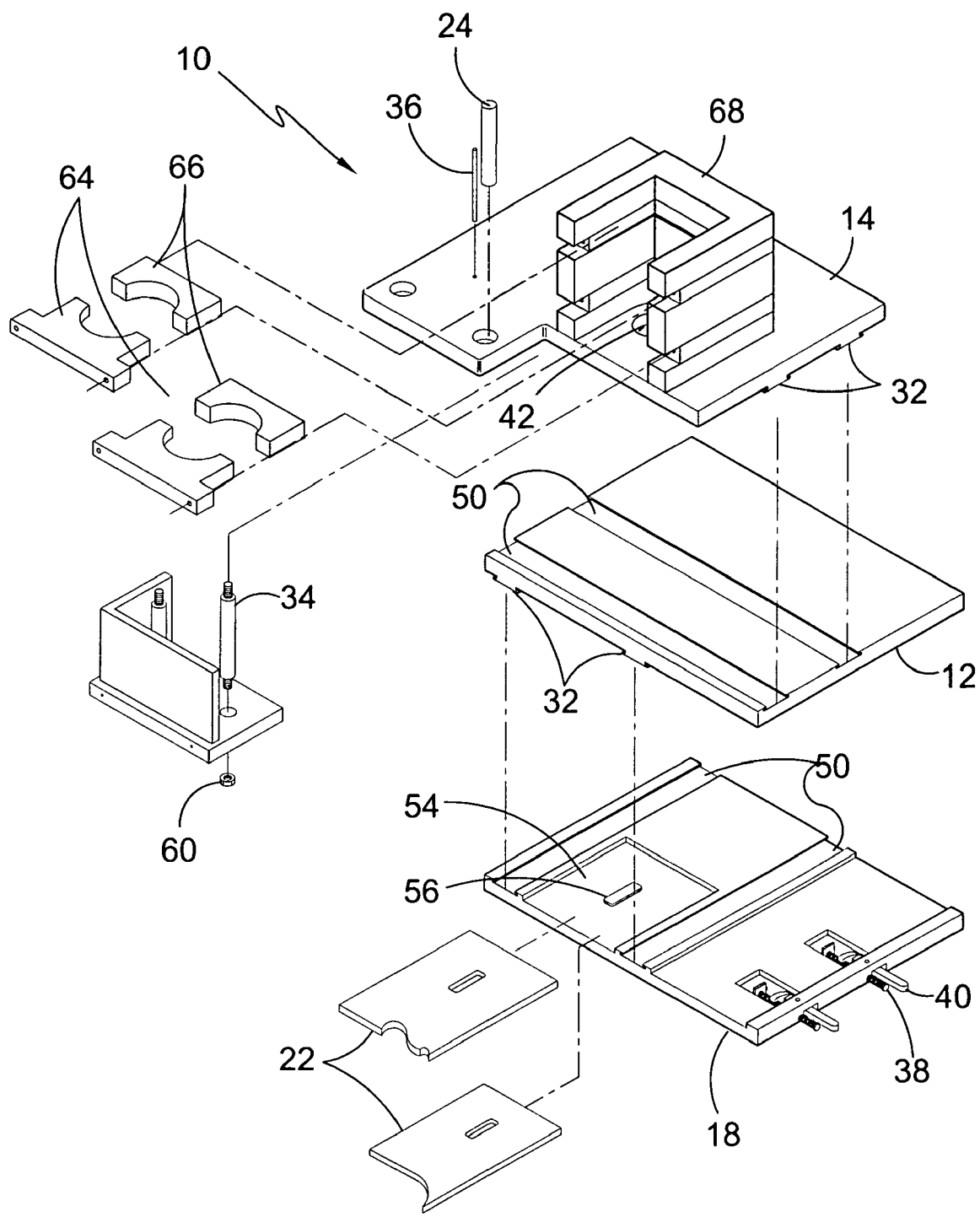
FIG. 9 is an exploded view of the alternate design of the present invention.

Turning to FIG. 9, shown therein is an exploded view of the alternate design of the present invention 10. Shown is an exploded view of the alternate design of the present invention 10 comprising a spiral cut-out tool attachment means or housing 68 having a first 12 and second 14 platform moving perpendicular to each other, the second platform having means for attaching 68 a cut-out tool and a tool bit aperture 42 passing therethrough, the attachment having a base 18 for holding a work piece and slidable means 32 for attaching the first and second platforms. Other previously disclosed elements are also shown.

Figure 10:
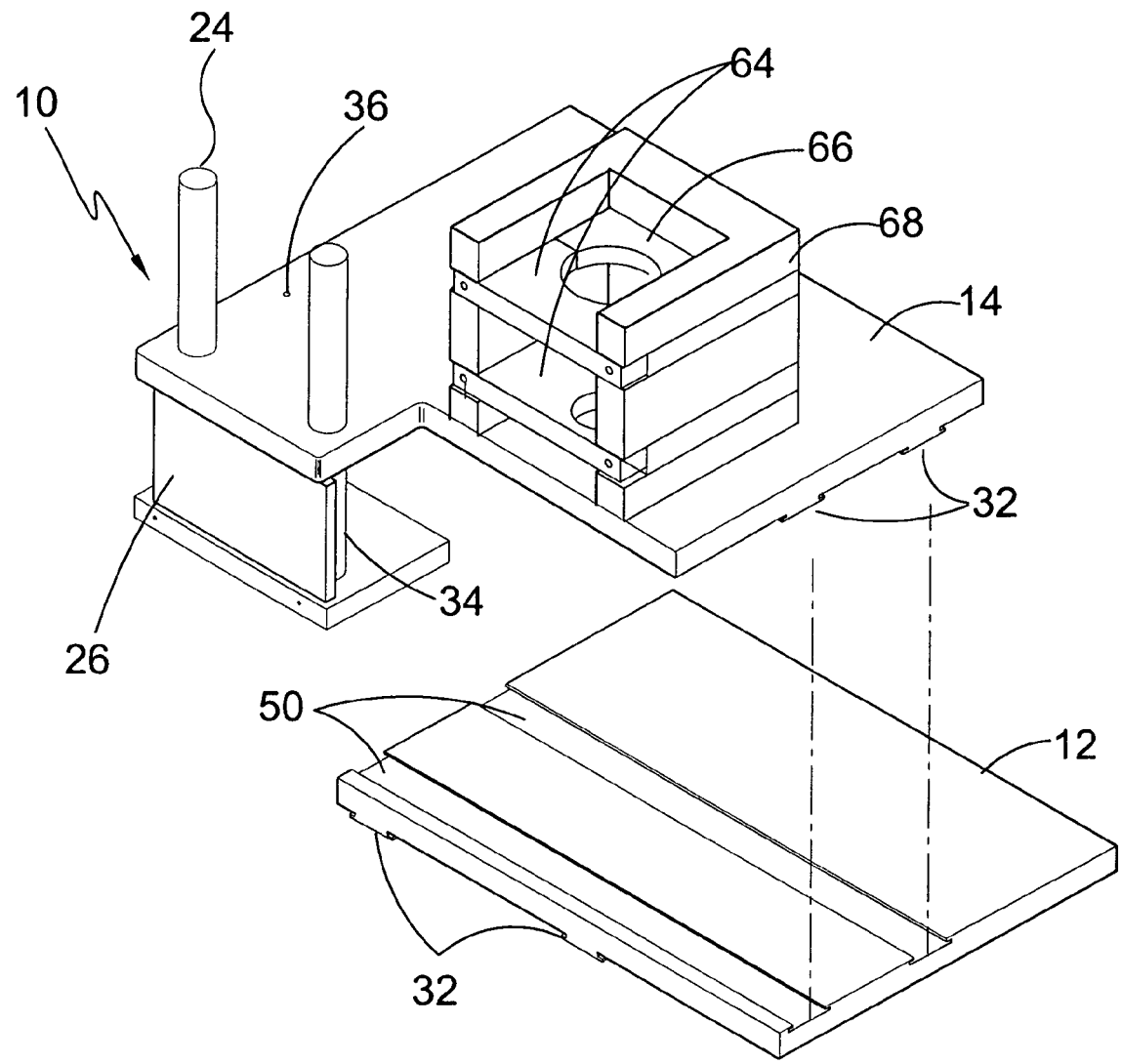
FIG. 10 is an exploded view of the alternate top plate of the present invention.

Turning to FIG. 10, shown therein is an exploded view of the alternate design of the present invention. Shown is an exploded view of the alternate design of the present invention 10 comprising a spiral cut-out tool attachment having a first 12 and second 14 platform moving perpendicular to each other, the second platform having means for attaching 68 a cut-out tool and a tool bit aperture passing therethrough, the attachment having a base for holding a work piece and slidable means 32 for attaching the first and second platforms. Other previously disclosed elements are also shown.

Figure 11:
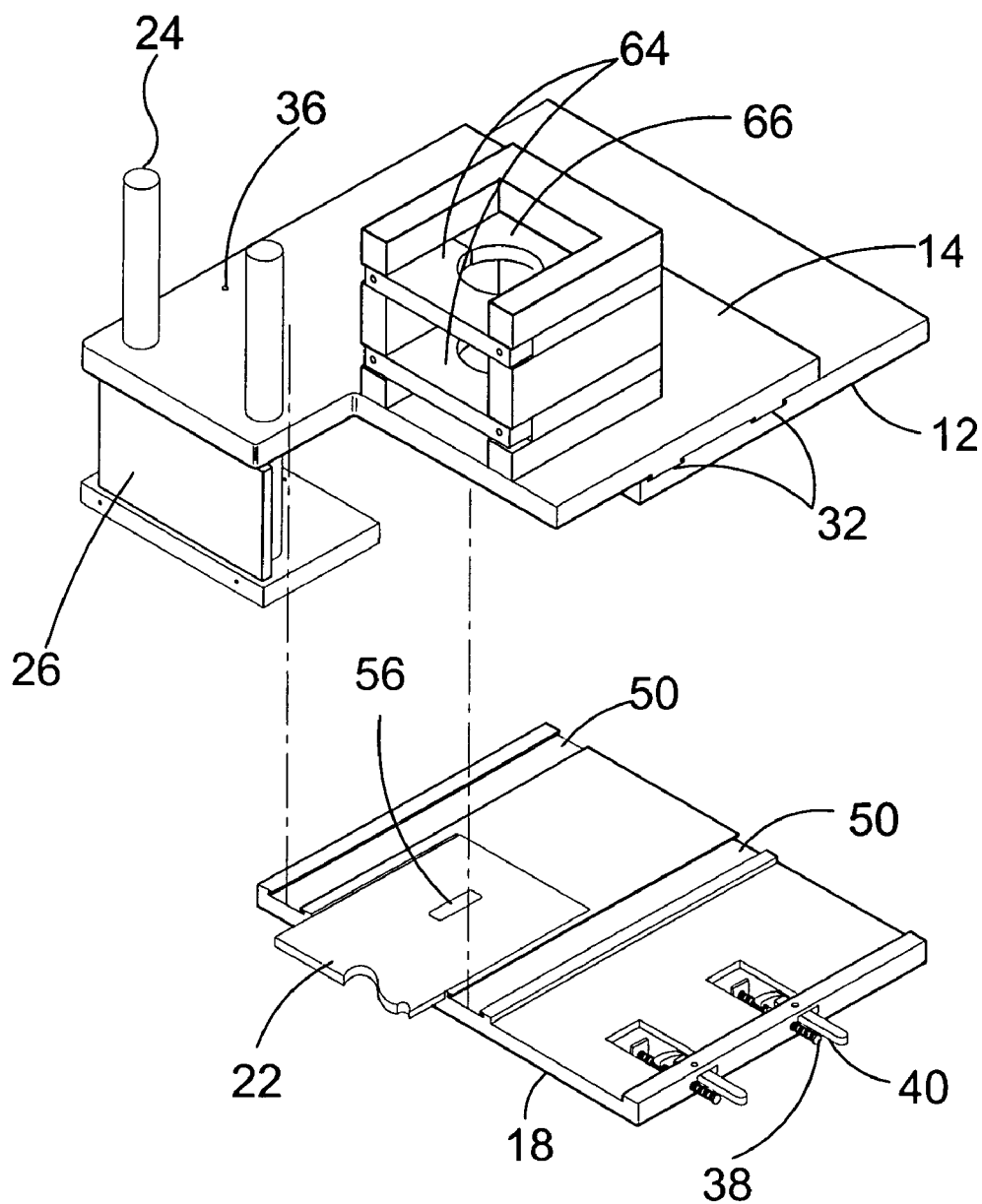
FIG. 11 is a perspective view of the alternate of the present invention with base piece exploded.

Turning to FIG. 11, shown therein is a perspective view of the alternate design of the present invention with base piece exploded. Shown is a perspective view of the alternate design of the present invention having a base plate 18, middle plate 12 and top plate 14. The middle plate 12 and top plate 14 move perpendicular to each other by means of channels 50 and sliders 32. The sliders 32 ride in the channels 50 as the plates 12, 14, 18 are in motion. Other previously disclosed elements are also shown.

Figure 12:
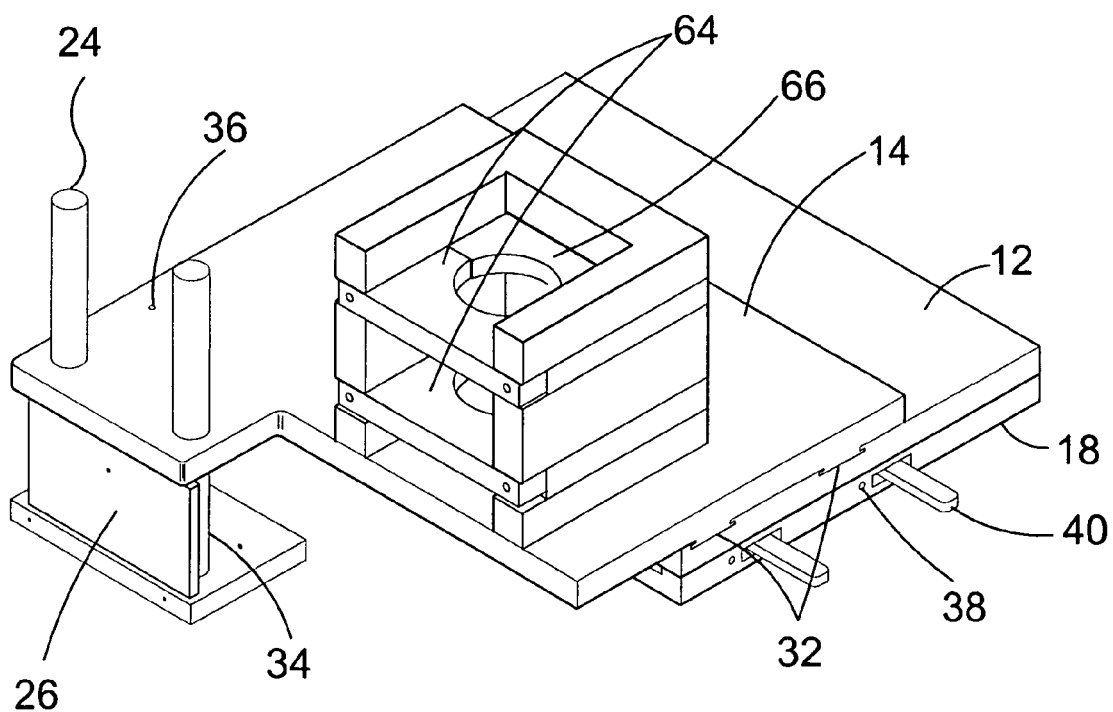
FIG. 12 is a perspective view of the alternate of the present invention assembled.

Turning to FIG. 12, shown therein is a perspective view of the alternate design of the present invention assembled. Shown is a perspective view of the alternate design of the present invention having a base plate 18, middle plate 12 and top plate 14. The middle plate 12 and top plate 14 move perpendicular to each other by means of channels 50 and sliders 32. The sliders 32 ride in the channels as the plates 12, 14, 18 are in motion. Other previously disclosed elements are also shown.

Figure 13:
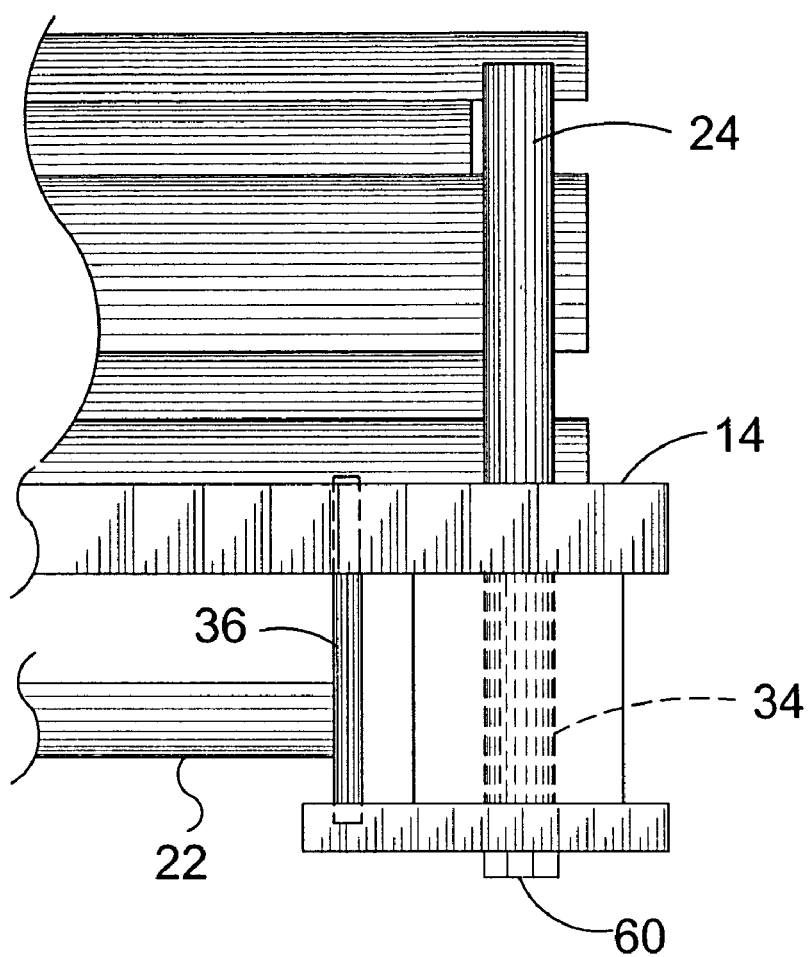
FIG. 13 is a partial side view of the alternate of the present invention.

Turning to FIG. 13, shown therein is a partial side view of the alternate design of the present invention. Shown is a partial side view of the alternate design of the present invention showing the stencil 22 engaging the guide pin 36. Other previously disclosed elements are also shown.

Figure 14:
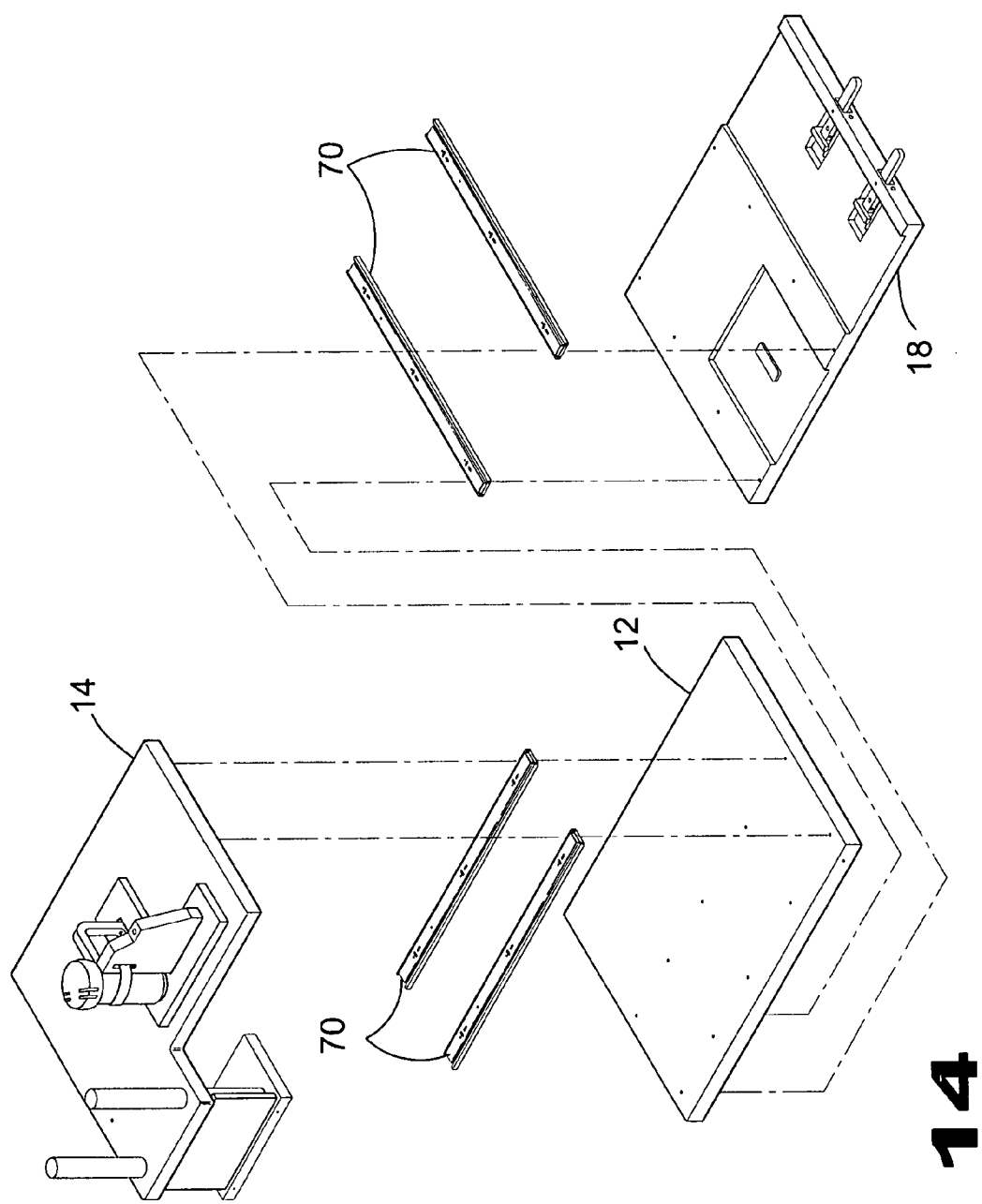
FIG. 14 is an alternate embodiment of the present invention having bearing roller assemblies.

Turning to FIG. 14, shown therein is an alternate embodiment of the present invention having bearing roller assemblies 70. Shown is an alternate embodiment of the present invention having bearing roller assemblies 70 that are removably attachable to each respective piece 12, 14, 18 to allow the pieces to move with respect to each other.

Figure 15:
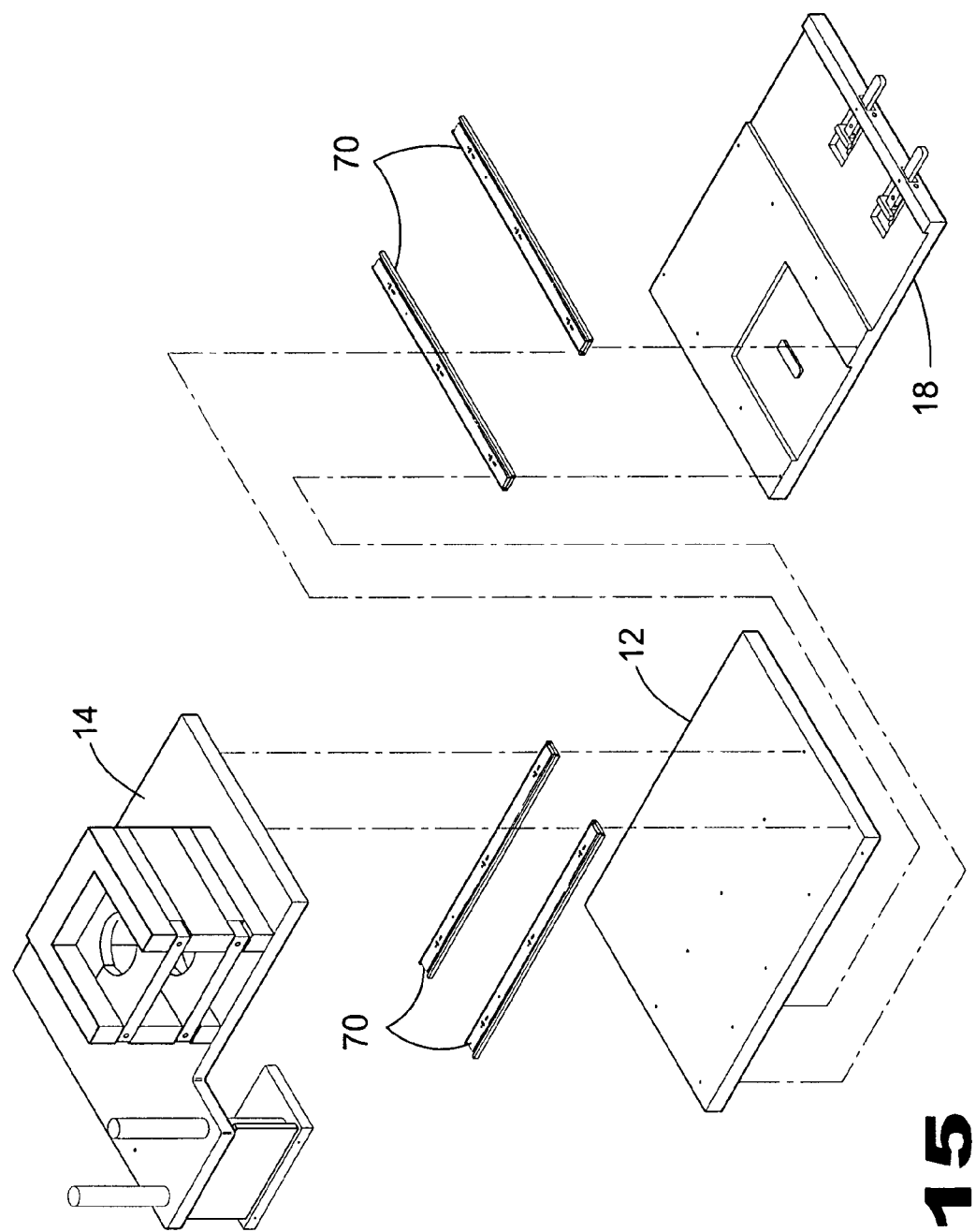
FIG. 15 is an alternate embodiment of the present invention having bearing roller assemblies.

Turning to FIG. 15, shown therein is an alternate embodiment of the present invention having bearing roller assemblies 70. Shown is an alternate embodiment of the present invention having bearing roller assemblies 70 that are removably attachable to each piece 12, 14, 18.

Figure 16:
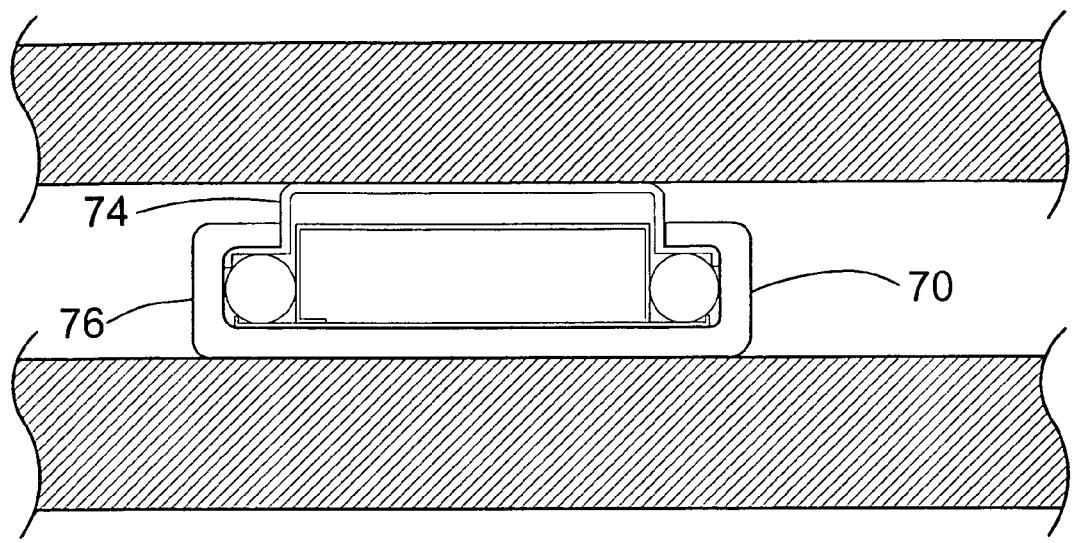
FIG. 16 is a sectional view of the present invention having bearing roller assemblies.

Turning to FIG. 16, shown therein is a sectional view of the present invention having bearing roller assemblies 70. Shown is the present invention having bearing roller assemblies 70 having an inner member 74 moving within outer member 76, which assemblies are removably attachable to the respective plates.

I claim:

1. An apparatus for providing a coping machine by attaching thereto a rotating cut-out tool having a rotating cutting bit, comprising:
   a) a top, middle and base plate, each plate having upper and lower surfaces, said lower surface of said top plate is disposed on said upper surface of said middle plate with said top plate overlapping said middle plate said lower surface of said middle plate is disposed on said upper surface of said base plate;
   b) means for attaching the rotating cut-out tool to said upper surface of said top plate whereby the cut-out tool can be removably attached to the top plate, the rotating cutting bit extending through a first aperture in the top plate in order to cut a work piece, said top plate having a second aperture to accommodate a guide pin to engage a template, said first and second apertures passing through said top plate in an overlapping area of said top plate so that said cutting bit and guide pin do not engage said middle plate;

c) means for guiding movement of said top plate over said middle plate in a direction in which said first and second apertures in said top plate remain in said overlapping area and means for guiding movement of said middle plate over said base plate in a direction at right angles to the direction of movement of said top plate on said middle plate;
d) means for removably attaching a template to said base plate, said template extending into an area under the overlapping portion of said top plate whereby said guide pin engages said template;
e) means for removably attaching a work piece to said base plate substantially adjacent said template; and,
f) said guide pin guiding movement of said top plate to permit the rotating cutting bit to cut an identical shape into the work piece.

2. The apparatus of claim 1, wherein:
a) said means for guiding movement of said top plate on said middle plate comprises a pair of parallel channels being disposed in said upper surface of said middle plate and a pair of downwardly extending sliders on the lower surface of said top plate engaging said channels in the upper surface of said middle plate;
b) said means for guiding movement or said middle plate on said base plate comprising a pair of parallel channels disposed in said upper surface of said base plate and a pair of downwardly extending sliders being disposed on said lower surface of said middle plate engaging said channels on said base plate, one of said channels on said base plate separating said work piece from said template; and,
c) wherein said sliders are adapted to be slidably secured in said respective channels of said respective plates to permit the plates to move in a transverse linear direction with respect to each other.

3. The apparatus of claim 2, wherein said means for attaching a template to said base plate comprises:
a) said upper surface of said base plate having a first designated portion therein for receiving the template so that a shaped edge of the template extends away from said base plate to a position contiguous to said guide pin; and,
b) a template stop being disposed in said first designated portion so as to mate to a template aperture in the template, the template aperture for receiving said template stop so as to removably secure the template to said base plate.

4. The apparatus of claim 3, wherein said means for attaching a work piece to said base plate comprises:
a) said upper surface of said base plate having a second designated portion therein for receiving a work piece so that an edge of the work piece to be cut extends away from said base plate to a position contiguous to the rotating cutting bit, said second designated portion being separated from said first designated portion by one of said channels on the upper surface of said base plate; and,
b) at least one locking member being disposed on said base plate, said locking member being adapted to removably secure a work piece in said second designated portion.

5. The apparatus of claim 4, further comprising a handle being disposed on said top plate so that the apparatus can be positioned by a user.

6. The apparatus of claim 5, further comprising a downwardly extending support member being disposed on said lower surface of said top plate, said support member being adapted to provide an additional support surface parallel to and beneath said top plate, wherein said guide pin has first and second opposing ends, said first end being disposed on said top plate and said second end being disposed on said support surface.

7. The apparatus of claim 6, wherein said handle has first and second opposing ends, said first end being disposed on said top plate and said second end being disposed on said support surface.

8. The apparatus of claim 7, wherein said support member is "L" shaped and is disposed on an edge of said top plate, wherein said support member is adjacent said first designated portion of said base plate.

9. The apparatus of claim 8, wherein said locking member extends into said base plate from a side surface thereof, wherein said locking member is spring-loaded so as to be biased toward the work piece, wherein said locking member has a retaining bolt disposed thereon to permit the locking member to be adjustably secured to the work piece.

* * * * *